(12) United States Patent
Yamanaka et al.

(10) Patent No.: US 10,180,113 B2
(45) Date of Patent: Jan. 15, 2019

(54) CONTROL SYSTEM FOR INTERNAL COMBUSTION ENGINE

(71) Applicant: HONDA MOTOR CO., LTD., Tokyo (JP)

(72) Inventors: Tatsuo Yamanaka, Wako (JP); Susumu Nakajima, Wako (JP); Naoki Yokoyama, Wako (JP); Kenji Hirose, Wako (JP); Hidekazu Hironobu, Wako (JP); Seiichi Hosogai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/697,583

(22) Filed: Sep. 7, 2017

(65) Prior Publication Data

US 2018/0073460 A1 Mar. 15, 2018

(30) Foreign Application Priority Data

Sep. 13, 2016 (JP) .................. 2016-178467

(51) Int. Cl.
*F02D 41/40* (2006.01)
*F02D 41/24* (2006.01)
(Continued)

(52) U.S. Cl.
CPC ......... *F02D 41/40* (2013.01); *F02D 41/2429* (2013.01); *F02D 41/2438* (2013.01);
(Continued)

(58) Field of Classification Search
CPC . F02P 5/045; F02P 5/151; F02D 37/02; F02D 41/2429; F02D 41/2438;
(Continued)

(56) References Cited

U.S. PATENT DOCUMENTS 9,026,342 B2 * 5/2015 Kemmer ................. F02D 41/38
123/478
2004/0267434 A1 * 12/2004 Asano ................. F02D 41/2438
701/104
(Continued)

FOREIGN PATENT DOCUMENTS

DE 10 2005 032 087 A1 1/2007
DE 10 2010 063 099 A1 6/2012
(Continued)

OTHER PUBLICATIONS

Office Action dated Nov. 21, 2017, issued in counterpart Japanese Application No. 2016-178467. (3 pages).
(Continued)

*Primary Examiner* — Erick Solis
*Assistant Examiner* — Anthony L Bacon
(74) *Attorney, Agent, or Firm* — Westerman, Hattori, Daniels & Adrian, LLP

(57) ABSTRACT

A control system for an internal combustion engine, which is capable of controlling fuel injection valves while causing valve-closing delay time periods, which occur with the valves actually mounted on the engine, to be reflected thereon, thereby making it possible to improve exhaust emission characteristics and fuel economy performance. The ECU of the control system performs initial value-specific control in fuel injection control and ignition timing control, such that initial value acquisition conditions are satisfied, so as to calculate the initial values of the valve-closing delay time periods when the initial value acquisition conditions are satisfied. When normal-time control is performed, the valve-opening time periods of the valves are calculated using the initial values of the valve-opening time periods, and the valves are controlled to be open over the valve-opening time periods.

7 Claims, 13 Drawing Sheets

(51) Int. Cl.
F02P 5/15 (2006.01)
F02D 41/38 (2006.01)
F02D 37/02 (2006.01)

(52) U.S. Cl.
CPC .......... F02D 41/2467 (2013.01); F02P 5/151 (2013.01); *F02D 37/02* (2013.01); *F02D 2041/389* (2013.01); *F02D 2200/063* (2013.01)

(58) Field of Classification Search
CPC .. F02D 41/2441; F02D 41/2467; F02D 41/40; F02D 2200/063
See application file for complete search history.

(56) References Cited

U.S. PATENT DOCUMENTS

| | | | | |
|---|---|---|---|---|
| 2011/0100333 | A1* | 5/2011 | Toyohara | F02D 41/20 123/490 |
| 2012/0209544 | A1* | 8/2012 | Takashima | F02D 41/221 702/50 |
| 2012/0239278 | A1* | 9/2012 | Becker | F02D 41/20 701/105 |
| 2016/0061139 | A1* | 3/2016 | Imai | F02D 41/3845 123/294 |
| 2016/0138511 | A1* | 5/2016 | Toyohara | F02D 41/20 123/478 |
| 2016/0177855 | A1* | 6/2016 | Kusakabe | F02D 41/20 123/490 |

FOREIGN PATENT DOCUMENTS

| | | |
|---|---|---|
| DE | 11 2014 002 856 T5 | 4/2016 |
| JP | 2002-371903 A | 12/2002 |
| JP | 2009-287571 A | 12/2009 |
| JP | 2016-33343 A | 3/2016 |
| WO | 2015/004988 A1 | 1/2015 |

OTHER PUBLICATIONS

Office Action dated Apr. 12, 2018, issued in counterpart German Application No. 10 2017 215 963.4, with English translation. (10 pages).

Search Report dated Apr. 12, 2018, issued in counterpart German Application No. 10 2017 215 963.4, with English translation. (14 pages).

* cited by examiner

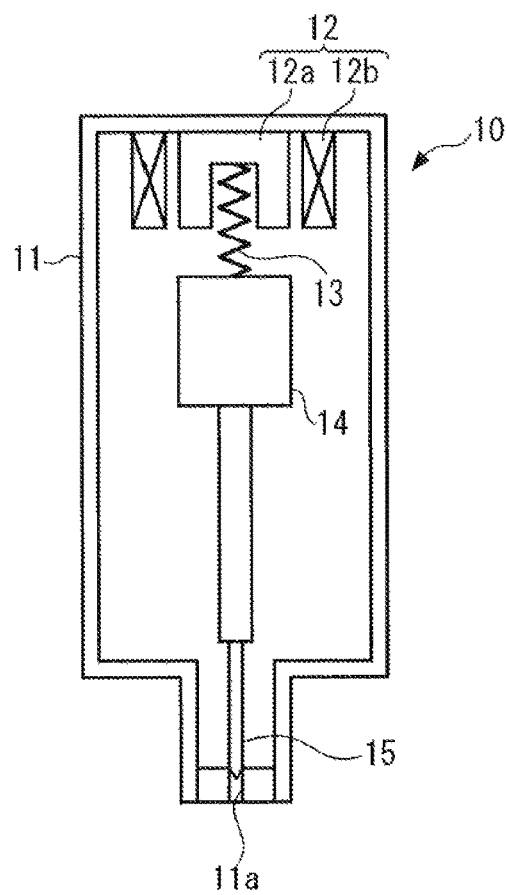
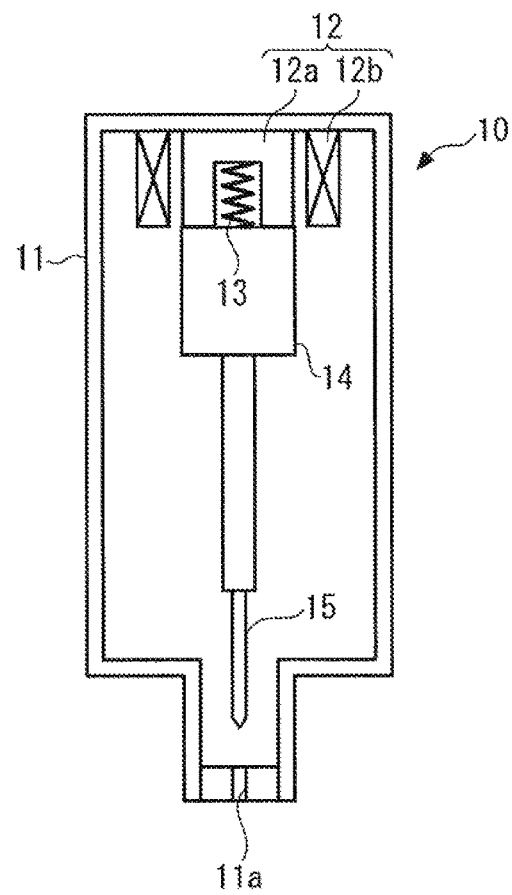

CONTROL SYSTEM FOR INTERNAL COMBUSTION ENGINE

BACKGROUND OF THE INVENTION

Field of the Invention

The present invention relates to a control system for an internal combustion engine that includes a fuel injection valve with which a valve-closing delay time period occurs.

Description of the Related Art

Conventionally, there has been known a control system for an internal combustion engine, which is disclosed in Japanese Laid-Open Patent Publication (Kokai) No. 2016-33343. This engine is a direct injection multi-cylinder engine, in which fuel is directly injected into a plurality of cylinders by a plurality of fuel injection valves provided in the respective cylinders. In the control system, energization time Ti over which the coil of each fuel injection valve is energized is controlled, as described hereafter.

According to the publication, a demanded injection amount-setting section 41 sets a demanded injection amount according to the stepped-on amount of an accelerator pedal, load on the engine, and the rotational speed of the engine, and an energization time-setting section 42 sets the energization time Ti over which the coil of each fuel injection valve is to be energized, according to the demanded injection amount, by interpolation using three maps M1 to M3 stored in a map storage section 43, which are formed by mapping the relationship between the energization time Ti and the demanded injection amount Q. In this case, in the map M1, the elastic coefficient of a spring of each fuel injection valve is set to that of a spring of a standard nominal product of fuel injection valve, and in the maps M2 and M3, the elastic coefficient of the spring is set to one larger and one smaller than the elastic coefficient of the spring of the nominal product of fuel injection valve, respectively.

Further, a learning section 44 learns the relationship between the energization time Ti actually output to the fuel injection valve, and measurement time Tc from the start time of energization of the coil of the fuel injection valve to valve-closing time. Furthermore, a spring characteristics estimation section 45 estimates the spring characteristics of each fuel injection valve by the learning section 44 by interpolation using three maps L1 to L3, according to the results of learning of the energization time Ti and the measurement time Tc.

Then, a correction section 46 calculates a correction amount by interpolation using the three maps M1 to M3, according to the results of estimation of the spring characteristics by the spring characteristics estimation section 45. The final energization time Ti is determined by correcting the energization time Ti set by the energization time-setting section 42 with the calculated correction amount.

In the case of a fuel injection valve for the engine, even if it is brand-new, the valve-closing delay time period (i.e. a time period from the time of termination of energization of the coil to the time of actual closing of the fuel injection valve), which occurs with the fuel injection valve actually mounted on the engine, generally varies between individual products of the fuel injection valve due to manufacturing errors of the individual products and so forth. On the other hand, according to the control system disclosed in Japanese Laid-Open Patent Publication (Kokai) No. 2016-33343, the energization time Ti is corrected by estimating the spring characteristics of each fuel injection valve using the maps L1 to L3, and then referring to the maps M1 to M3 according to a result of the estimation, but the maps L1 to L3 and M1 to M3 are merely formed based on operating characteristics of the standard fuel injection valve, which makes it impossible to cause variation in the valve-closing delay time period between the individual products, which occurs with the fuel injection valves actually mounted on the engine, to be reflected on the corrected energization time Ti.

As a consequence, although the correction of the energization time Ti is performed, an error in the actual valve-opening time period with respect to the energization time Ti is caused by the variation in the valve-closing delay time period between the individual mounted fuel injection valves. This can cause control errors of a fuel injection mount and an air-fuel ratio, and the like, thereby causing degradation of exhaust emission characteristics and lowering of fuel economy performance. Further, not only in a multi-cylinder engine but also in a single-cylinder engine, the same problems can be caused by the fact that the variation in the valve-closing delay time period, which occurs with the fuel injection valve actually mounted on the engine, is not reflected on the corrected energization time Ti.

SUMMARY OF THE INVENTION

It is an object of the present invention to provide a control system for an internal combustion engine, which is capable of controlling a fuel injection valve while causing a valve-closing delay time period of the fuel injection valve, which occurs with the fuel injection valve actually mounted on the engine, to be reflected thereon, thereby making it possible to improve exhaust emission characteristics and fuel economy performance.

To attain the above object, the present invention provides a control system for an internal combustion engine that includes a fuel injection valve with which a valve-closing delay time period occurs from when a command for closing the fuel injection valve is delivered to the fuel injection valve to when the fuel injection valve is actually closed, comprising initial value-specific control means for performing initial value-specific control in which in order to cause initial value acquisition conditions for acquiring an initial value of the valve-closing delay time period to be satisfied, a valve-opening time period of the fuel injection valve is controlled and an ignition timing of the engine is controlled to a retarded side, initial value acquisition means for acquiring the initial value of the valve-closing delay time period when the initial value acquisition conditions are satisfied during execution of the initial value-specific control, valve-opening time period calculation means for calculating the valve-opening time period of the fuel injection valve, using the initial value of the valve-closing delay time period, when normal-time control other than the initial value-specific control is performed, and fuel injection control means for controlling the fuel injection valve such that the fuel injection valve is opened over the calculated valve-opening time period when the normal-time control is performed.

According to this control system for an internal combustion engine, the initial value-specific control is performed in which in order to cause initial value acquisition conditions for acquiring the initial value of the valve-closing delay time period to be satisfied, the valve-opening time period of the fuel injection valve is controlled, and the ignition timing of the engine is controlled to a retarded side, and when the initial value acquisition conditions are satisfied during execution of the initial value-specific control, the initial value of the valve-closing delay time period is acquired. Further, when the normal-time control other than the initial value-specific control is performed, the valve-opening time period of the fuel injection valve is calculated using the initial value of the valve-closing delay time period, and the fuel injection valve is controlled such that the fuel injection valve is opened over the calculated valve-opening time period. As described above, during execution of the initial value-specific control, when the initial value acquisition conditions are satisfied, the initial value of the valve-closing delay time period is acquired. Therefore, by setting the execution time of the initial value-specific control and the acquisition time of the initial value to a time when the fuel injection valve is actually mounted on the engine, it is possible, when the normal-time control is performed thereafter, to control the fuel injection valve while causing the valve-closing delay time period, i.e. operating characteristics of the fuel injection valve actually mounted on the engine, to be reflected thereon. This makes it possible to improve control accuracy of a fuel injection amount and an air-fuel ratio, whereby it is possible to improve exhaust emission characteristics and fuel economy performance. (Note that throughout the description, the term "acquire" used in phrases, such as "acquiring the initial value of the valve-closing delay time period" and "acquiring the learned value", is intended to mean not only directly detecting these values e.g. by sensors but also calculating or estimating the values based on other parameters).

Preferably, the initial value acquisition conditions include that the valve-opening time period of the fuel injection valve is not shorter than a predetermined value.

The present applicant has confirmed by experiment that in a case where the valve-opening time period of the fuel injection valve is in a region not shorter than the predetermined value, electric current flowing through a coil of a solenoid of the fuel injection valve becomes stable, whereby the valve-closing delay time period of the fuel injection valve becomes stable (see FIGS. 8A and 8B, referred to hereinafter). Therefore, with the configuration of the preferred embodiment, since the initial value acquisition conditions include that the valve-opening time period of the fuel injection valve is not shorter than the predetermined value, it is possible to acquire the initial value of the valve-closing delay time period in the state in which the valve-closing delay time period is thus stabilized, whereby it is possible to improve the acquisition accuracy of the initial value.

Preferably, the initial value acquisition conditions include that a rotational speed of the engine is in a predetermined rotational speed region, that fuel pressure supplied to the fuel injection valve is in a predetermined pressure region, and that a fuel temperature is in a predetermined temperature region.

In general, it is known that the valve-closing delay time period of the fuel injection valve is influenced by the rotational speed of the engine, the fuel pressure supplied to the fuel injection valve, and the fuel temperature. On the other hand, with the configuration of the preferred embodiment, the initial value acquisition conditions include that the rotational speed of the engine is in the predetermined rotational speed region, that the fuel pressure supplied to the fuel injection valve is in the predetermined pressure region, and that the fuel temperature is in the predetermined temperature region, and hence by properly setting the predetermined rotational speed region, the predetermined pressure region, and the predetermined temperature region, it is possible to acquire the initial value of the valve-closing delay time period in the state in which the valve-closing delay time period of the fuel injection valve is stable, whereby it is possible to further improve the acquisition accuracy of the initial value of the valve-closing delay time period.

Preferably, the control system further comprises learned value acquisition means for acquiring a learned value of the valve-closing delay time period when conditions for learning the valve-closing delay time period are satisfied during execution of the normal-time control, and the valve-opening time period calculation means calculates the valve-opening time period of the fuel injection valve using a difference between the learned value of the valve-closing delay time period and the initial value of the valve-closing delay time period.

With the configuration of the preferred embodiment, when the conditions for learning the valve-closing delay time period are satisfied during execution of the normal-time control, the learned value of the valve-closing delay time period is acquired, and the valve-opening time period of the fuel injection valve is calculated using the difference between the learned value of the valve-closing delay time period and the initial value of the valve-closing delay time period. Therefore, it is possible to control the valve-opening time period of the fuel injection valve while causing changes in the valve-closing delay time period from the time point of acquiring the initial value of the valve-closing delay time period to the present time point, to be reflected thereon. This makes it possible to improve the control accuracy of the valve-opening time period of the fuel injection valve.

More preferably, the control system further comprises basic value calculation means for calculating a basic value of the valve-opening time period according to an operating state of the engine, and correction value calculation means for calculating a correction value using a value obtained by multiplying the difference between the learned value of the valve-closing delay time period and the initial value of the valve-closing delay time period by a predetermined coefficient, and the valve-opening time period calculation means calculates the valve-opening time period by correcting the basic value of the valve-opening time period with the correction value.

With the configuration of the preferred embodiment, the basic value of the valve-opening time period is calculated according to the operating state of the engine, and the correction value is calculated using the value obtained by multiplying the difference between the learned value of the valve-closing delay time period and the initial value of the valve-closing delay time period by the predetermined coefficient. Further, the valve-opening time period is calculated by correcting the basic value of the valve-opening time period with the correction value. Therefore, by properly setting these predetermined coefficients, it is possible to calculate the valve-opening time period of the fuel injection valve while causing the changes in the valve-closing delay time period from the time point of acquiring the initial value of the valve-closing delay time period to the present time point, to be properly reflected thereon. This makes it possible to further improve the calculation accuracy of the valve-opening time period of the fuel injection valve.

More preferably, the learning conditions include that the valve-opening time period of the fuel injection valve is not shorter than a predetermined value.

With the configuration of the preferred embodiment, the learning conditions include that the valve-opening time period of the fuel injection valve is not shorter than the predetermined value, and hence, as described above, it is possible to acquire the learned value of the valve-closing delay time period in the state in which the valve-closing delay time period of the fuel injection valve is stable, whereby it is possible to further improve the acquisition accuracy of the learned value of the valve-closing delay time period.

More preferably, the learning conditions include that the rotational speed of the engine is in a predetermined rotational speed region, that the fuel pressure supplied to the fuel injection valve is in a predetermined pressure region, and that the fuel temperature is in a predetermined temperature region.

With the configuration of the preferred embodiment, the learning conditions include that the rotational speed of the engine is in the predetermined rotational speed region, that the fuel pressure supplied to the fuel injection valve is in the predetermined pressure region, and that the fuel temperature is in the predetermined temperature region. Therefore, for the above-described reason, by properly setting the predetermined rotational speed region, the predetermined pressure region, and the predetermined temperature region, it is possible to further improve the acquisition accuracy of the learned value of the valve-closing delay time period.

Preferably, the engine includes a plurality of cylinders, and the fuel injection valve provided in each of the plurality of cylinders, and the initial value acquisition means acquires the initial value of the valve-closing delay time period on a fuel injection valve-by-fuel injection valve basis.

With the configuration of the preferred embodiment, in the multi-cylinder engine including the plurality of cylinders and the fuel injection valves provided in the plurality of cylinders, respectively, even in a case where there is variation in operating characteristics between the plurality of fuel injection valves, it is possible to control each fuel injection valve while causing the valve-closing delay time period, which occurs with the fuel injection valve actually mounted on the engine, to be reflected thereon. This makes it possible to improve exhaust emission characteristics and fuel economy performance, in the multi-cylinder engine as well.

The above and other objects, features, and advantages of the present invention will become more apparent from the following detailed description taken in conjunction with the accompanying drawings.

BRIEF DESCRIPTION OF THE DRAWINGS

FIG. 2A is a schematic diagram of a fuel injection valve in a closed state;

FIG. 2B is a schematic diagram of the fuel injection valve in an open state;

DETAILED DESCRIPTION OF PREFERRED EMBODIMENTS

Figure 1:
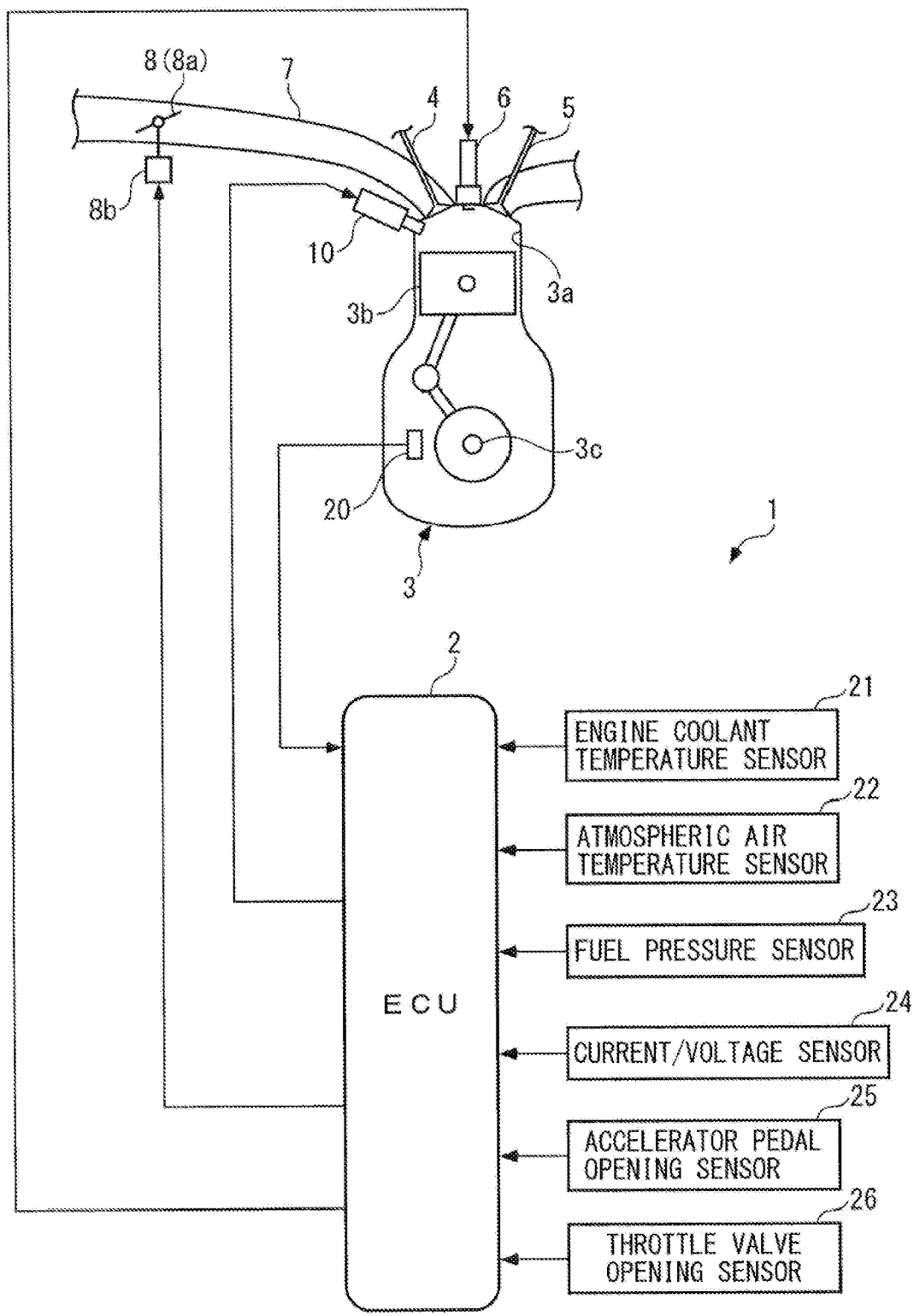
FIG. 1 is a schematic diagram of a control system according to an embodiment of the present invention and an internal combustion engine to which the control system is applied.

Hereafter, a control system for an internal combustion engine according to an embodiment of the invention will be described with reference to drawings. As shown in FIG. 1, the control system 1 of the present invention includes an ECU 2, which performs various control processes in the internal combustion engine (hereinafter simply referred to as the "engine") 3, as described hereafter.

The engine 3 is an in-line four-cylinder gasoline engine having four pairs of cylinders 3a and pistons 3b (only one pair of which is shown), and is installed on a vehicle (not shown). The engine 3 includes intake valves 4, exhaust valves 5, spark plugs 6, and fuel injection valves 10 provided for the respective cylinders 3a. Note that in the following description, the four cylinders 3a are referred to as the "first to fourth cylinders 3a" in the order of arrangement thereof, and the fuel injection valves 10 provided for the first to fourth cylinders 3a are referred to as the "first to fourth injection valves 10", respectively.

Each spark plug 6 is electrically connected to the ECU 2, and an ignition timing at which a mixture is ignited by the spark plug 6 is controlled by the ECU 2, as described hereinafter. That is, ignition timing control is performed by the ECU 2.

Each fuel injection valve 10 is provided such that the tip end thereof faces inside an associated cylinder 3a, and is connected to an associated delivery pipe (not shown) of a fuel supply system (not shown). During operation of the engine 3, high-pressure fuel is supplied from the delivery pipe to the fuel injection valve 10, whereby the fuel is injected into the cylinder 3a along with opening of the fuel injection valve 10.

As shown in FIGS. 2A and 2B, the fuel injection valve 10 is comprised of a casing 11, an electromagnet 12, a spring 13, an armature 14, and a valve element 15. The electromagnet 12 is fixed to an inner surface of a top wall of the casing 11, and is comprised of a yoke 12a and a coil 12b wound around an outer periphery of the yoke 12a. The coil 12b is electrically connected to the ECU 2 via a drive circuit (not shown), and the electromagnet 12 is switched between an excited state and a non-excited state by supplying and stopping a valve-opening command signal from the ECU 2.

Further, the spring 13 is arranged between the yoke 12a of the electromagnet 12 and the armature 14, and always urges the valve element 15 in a valve-closing direction via the armature 14. With this, when the electromagnet 12 is not excited, the valve element 15 is held in a state closing an injection hole 11a of the tip end of the casing 11, whereby the fuel injection valve 10 is in a closed state (see FIG. 2A).

With the construction described above, in the fuel injection valve 10, when the valve-opening command signal from the ECU 2 is supplied to the coil 12b via the drive circuit, thereby exiting the electromagnet 12, the armature 14 is attracted toward the yoke 12a against the urging force of the spring 13. Along with this attraction, the valve element 15 is moved toward the yoke 12a to open the injection hole 11a, whereby the fuel injection valve 10 is opened (see FIG. 2B). In the following, the amount of movement of the valve element 15 toward the yoke 12a is referred to as the "lift" of the fuel injection valve 10. From this state, when the supply of the valve-opening command signal is stopped, thereby switching the electromagnet 12 to the non-excited state, the fuel injection valve 10 is closed by the urging force of the spring 13, as described above.

Figure 3A:
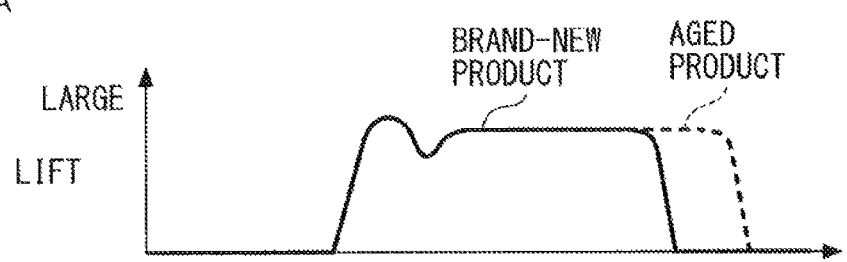
FIGS. 3A and 3B are timing diagrams showing a relationship between lifts of a brand-new fuel injection valve and an aged fuel injection valve (FIG. 3A), and a valve-opening command signal (FIG. 3B)
Figure 3B:
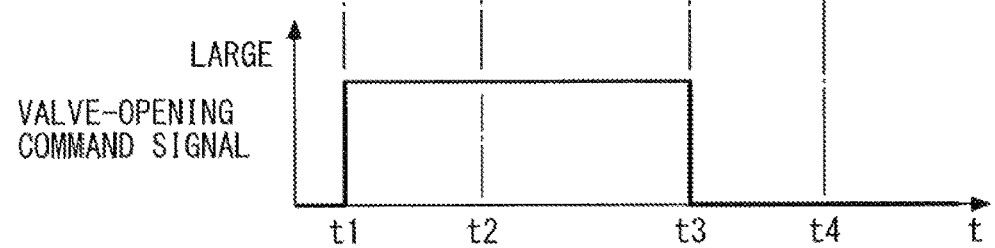

As described heretofore, in a case where the fuel injection valve 10 is opened and closed by the valve-opening command signal, an actual operating state of the fuel injection valve 10 is as shown in FIGS. 3A and 3B. Note that in FIGS. 3A and 3B, Ti represents a valve-opening time period of the fuel injection valve 10, which is calculated as described hereinafter. As shown in FIGS. 3A and 3B, when the valve-opening command signal is input to the fuel injection valve 10 at a time point t1, the valve element 15 starts to move toward the yoke 12a at a time point t2 due to a response delay characteristic of the fuel injection valve 10, thereby causing the lift to be increased.

Then, when the input of the valve-opening command signal is stopped at a time (time point t3) when the valve-opening time period Ti has elapsed after the input of the valve-opening command signal, the lift is reduced thereafter as the valve element 15 is moved toward a closing position by the urging force of the spring 13, and at a time point t4, the fuel injection valve 10 is fully closed to thereby make the lift equal to 0. In the following description, a time period from the stop time of the input of the valve-opening command signal to a time when the lift actually becomes equal to 0 is referred to as the "valve-closing delay time period Toff".

In this case, the valve-closing delay time period Toff is determined by the urging force of the spring 13, and hence when the spring 13 is aged to change an elastic coefficient thereof, the valve-closing delay time period Toff becomes longer than when the fuel injection valve 10 is brand-new, as indicated by a broken line in FIG. 3A. As a consequence, even when a valve-opening command signal for the same valve-opening time period Ti is input, the actual valve-opening time period of an aged fuel injection valve 10 is longer than that of a brand-new one, resulting in injection of extra fuel. To solve this problem, in a fuel injection control process of the present embodiment, the valve-opening time period Ti is calculated using a correction method, described hereinafter.

Further, a throttle valve mechanism 8 is provided in an intake passage 7 of the engine 3. The throttle valve mechanism 8 includes a throttle valve 8a and a TH actuator 8b for actuating the throttle valve 8a to open and close the same. The throttle valve 8a is pivotally provided in an intermediate portion of the intake passage 7 and changes the amount of air passing therethrough by a change in an opening caused by the pivotal motion thereof. The TH actuator 8b is formed by combining an electric motor (not shown) connected to the ECU 2 and a gear mechanism (not shown), and is controlled by a drive signal from the ECU 2 to thereby change the opening TH of the throttle valve 8a (hereinafter referred to as the "throttle valve opening TH").

Furthermore, a crank angle sensor 20, an engine coolant temperature sensor 21, an atmospheric air temperature sensor 22, a fuel pressure sensor 23, a current/voltage sensor 24, an accelerator pedal opening sensor 25, and a throttle valve opening sensor 26 are electrically connected to the ECU 2.

The crank angle sensor 20 is formed by a magnet rotor and an MRE pickup, and delivers a CRK signal and a TDC signal, which are both pulse signals, to the ECU 2 along with rotation of a crankshaft 3c. Each pulse of the CRK signal is delivered whenever the crankshaft 3c rotates through a crank angle of 30°. The ECU 2 calculates a rotational speed NE of the engine 3 (hereinafter referred to as "the engine speed NE") based on the CRK signal.

In addition to this, the ECU 2 calculates a crank angle CA, which is a rotational angle of the crankshaft 3c, based on the CRK signal and a detection signal from a cam angle sensor (not shown) for detecting a rotational angle of a camshaft (not shown). Further, the TDC signal indicates that the piston 3b in one of the cylinders 3a is in a predetermined crank angle position slightly before the TDC position of the intake stroke, and in the case of the four-cylinder engine of the present embodiment, each pulse thereof is delivered whenever the crankshaft rotates through a crank angle of 180°.

Further, the engine coolant temperature sensor 21 detects an engine coolant temperature TW, which is the temperature of engine coolant circulating through a cylinder block of the engine 3, to deliver a detection signal indicative of the detected engine coolant temperature TW to the ECU 2. The atmospheric air temperature sensor 22 detects an atmospheric air temperature TA, and delivers a detection signal indicative of the detected atmospheric air temperature TA to the ECU 2.

Furthermore, the fuel pressure sensor 23 detects fuel pressure PF, which is pressure of fuel in the delivery pipe, and delivers a detection signal indicative of the detected fuel pressure PF to the ECU 2. The current/voltage sensor 24 detects a voltage Vinj between opposite ends of the electromagnet 12 of the fuel injection valve 10 and electric current Iinj flowing through the electromagnet 12, and delivers a detection signal indicative of the detected voltage Vinj and a detection signal indicative of the detected electric current Iinj to the ECU 2. Note that in the following description, the voltage Vinj and the electric current Iinj are referred to as the "solenoid voltage Vinj" and the "solenoid current Iinj", respectively.

Further, the accelerator pedal opening sensor 25 detects a stepped-on amount AP of an accelerator pedal (not shown) of the vehicle (hereinafter referred to as the "accelerator pedal opening AP"), and delivers a detection signal indicative of the detected accelerator pedal opening AP to the ECU 2. The throttle valve opening sensor 26 detects the throttle valve opening TH, and delivers a detection signal indicative of the detected throttle valve opening TH to the ECU 2.

The ECU 2 is implemented by a microcomputer comprised of a CPU, a RAM, a ROM, an E2PROM, and an I/O interface (none of which are specifically shown), and performs various control processes, as described hereinafter, according to the detection signals from the aforementioned sensors 20 to 26, and so forth. Note that, in the present embodiment, the ECU 2 corresponds to initial value-specific control means, initial value acquisition means, valve-opening time period calculation means, fuel injection control means, learned value acquisition means, basic value calculation means, and correction value calculation means.

Next, a description will be given of the various control processes performed by the ECU 2. Note that although various calculated values or set values, referred to hereinafter, are written and stored in one of the RAM and the E2PROM of the ECU 2, they are written in the RAM unless otherwise specified.

First, an initial value learning process will be described with reference to FIG. 4. As will be described hereinafter, the initial value learning process learns an initial value Toff_ini of the valve-closing delay time period, and is performed by the ECU 2 at a predetermined control period ΔT (e.g. several tens of msec).

Figure 4:
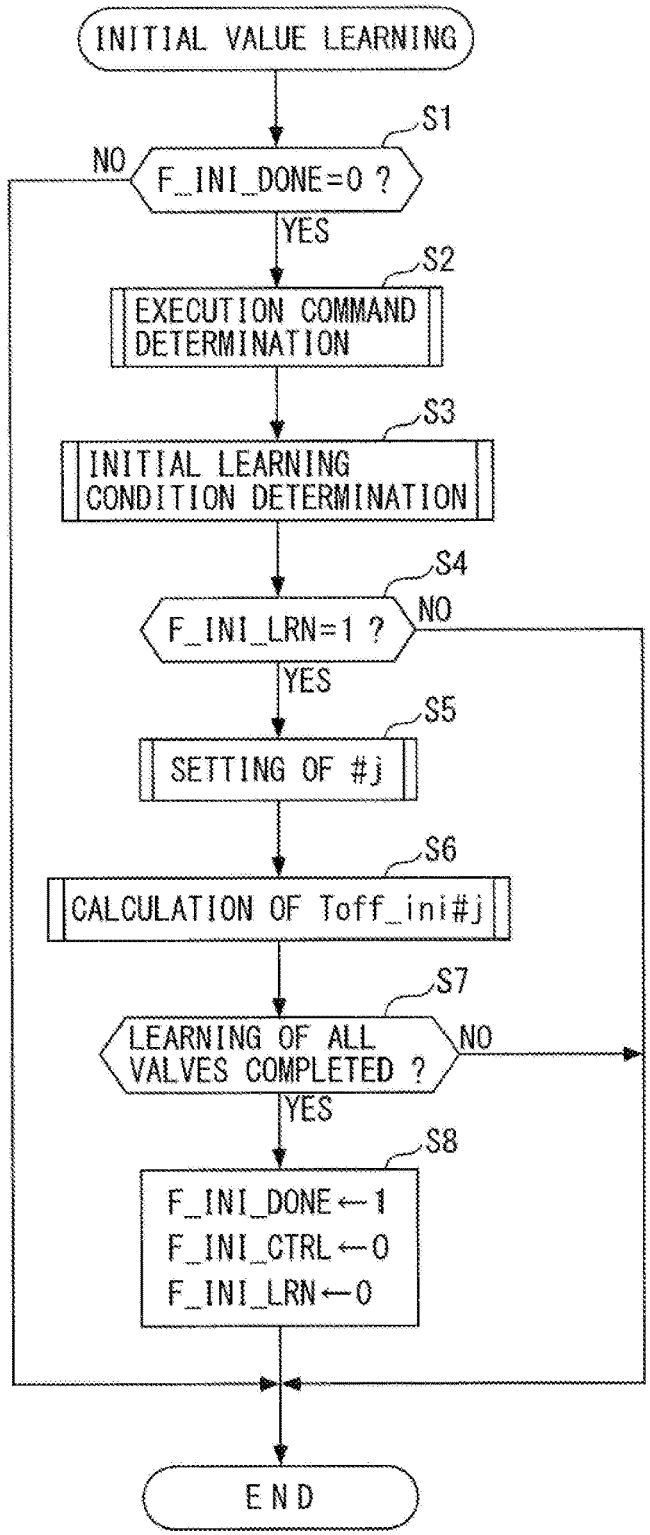
FIG. 4 is a flowchart of an initial value learning process.

As shown in FIG. 4, first, in a step 1 (shown as S1 in abbreviated form in FIG. 4; the following steps are also shown in abbreviated form), it is determined whether or not an initial value learning completion flag F_INI_DONE stored in the E2PROM is equal to 0. If the answer to this question is negative (NO), i.e. if the initial value learning completion flag F_INI_DONE=1 holds, which means that the initial value Toff_ini of the valve-closing delay time period has been learned, the present process is immediately terminated.

On the other hand, if the answer to the question of the step 1 is affirmative (YES), i.e. if the initial value Toff_ini of the valve-closing delay time period has not been learned, the process proceeds to a step 2, wherein an execution command determination process is performed. The execution command determination process determines whether or not an execution command signal for executing an initial value-specific control process has been input, and is specifically performed as described with reference to FIG. 5.

Figure 5:
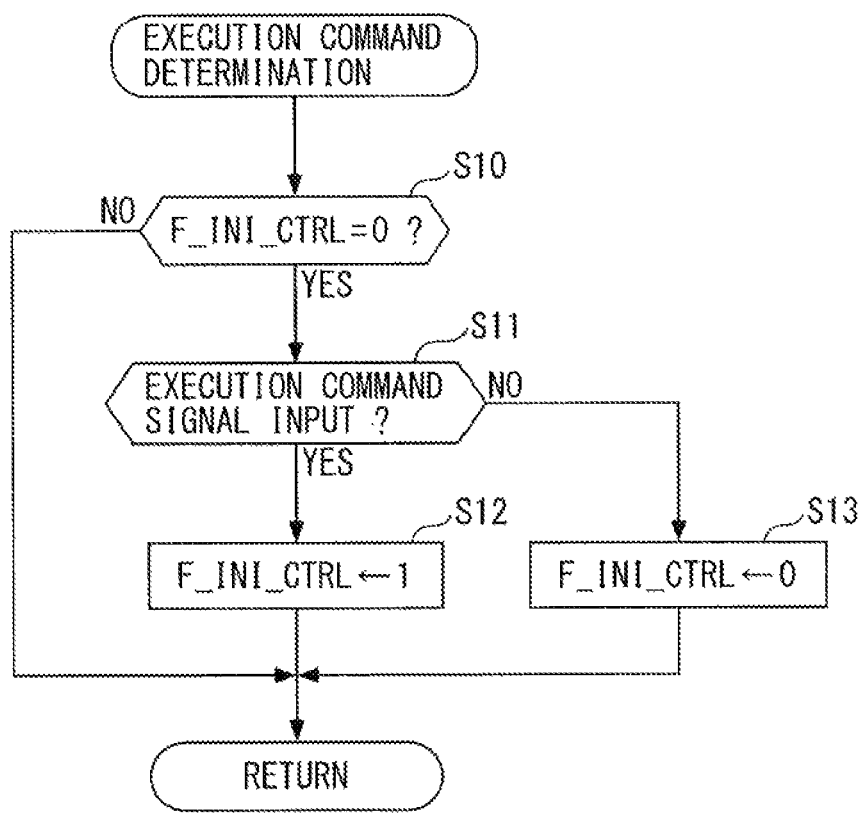
FIG. 5 is a flowchart of an execution command determination process.

Referring to FIG. 5, first, in a step 10, it is determined whether or not an initial value-specific control flag F_INI_CTRL is equal to 0. If the answer to this question is negative (NO), i.e. if the execution command signal was input at the immediately preceding or earlier control time, the present process is immediately terminated.

On the other hand, if the answer to the question of the step 10 is affirmative (YES), i.e. if the execution command signal was not input at the immediately preceding or earlier control time, the process proceeds to a step 11, wherein it is determined whether or not the execution command signal for executing the initial value-specific control process has been input. The execution command signal is input from an inspection device to the ECU 2 by manual operation of an inspector after the inspection device is electrically connected to the ECU 2, when a brand-new vehicle is to be inspected in a factory before being provided to a user, or when a faulty fuel injection valve or ECU 2 is replaced with a normal one at a service station.

If the answer to the question of the step 11 is affirmative (YES), i.e. if the execution command signal has been input, to indicate that the initial value-specific control process should be performed, the process proceeds to a step 12, wherein the initial value-specific control flag F_INI_CTRL is set to 1, followed by terminating the present process.

On the other hand, if the answer to the question of the step 11 is negative (NO), the process proceeds to a step 13, wherein the initial value-specific control flag F_INI_CTRL is set to 0, followed by terminating the present process.

Referring again to FIG. 4, after the execution command determination process is performed in the step 2, as describe above, the process proceeds to a step 3, wherein an initial learning condition determination process is performed. As described hereafter, the initial learning condition determination process determines whether or not conditions for learning the initial value Toff_ini of the valve-closing delay time period (initial value acquisition condition) are satisfied, and is specifically performed as described with reference to FIG. 6.

Figure 6:
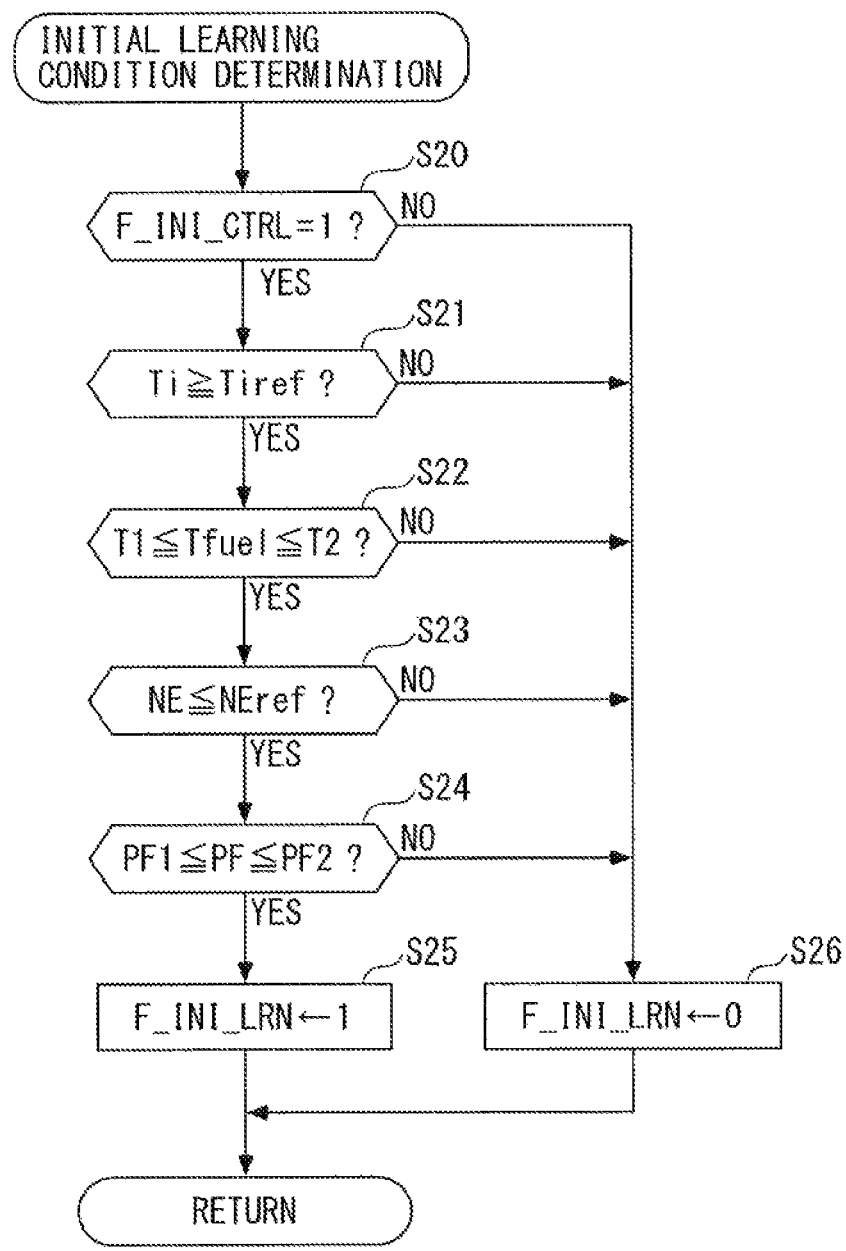
FIG. 6 is a flowchart of an initial learning condition determination process.
Figure 7A:
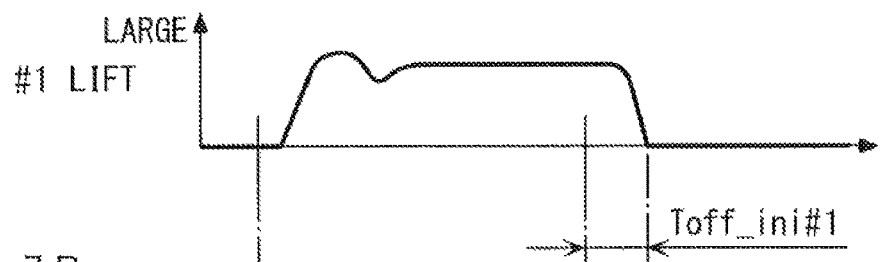
FIG. 7A to 7E are timing diagrams showing relationships between lifts of the fuel injection valves of first to fourth cylinders (FIGS. 7A to 7D), and the valve-opening command signal (FIG. 7E)
Figure 7B:
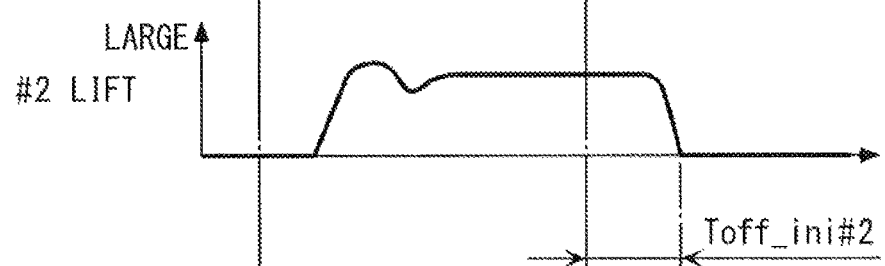
Figure 7C:
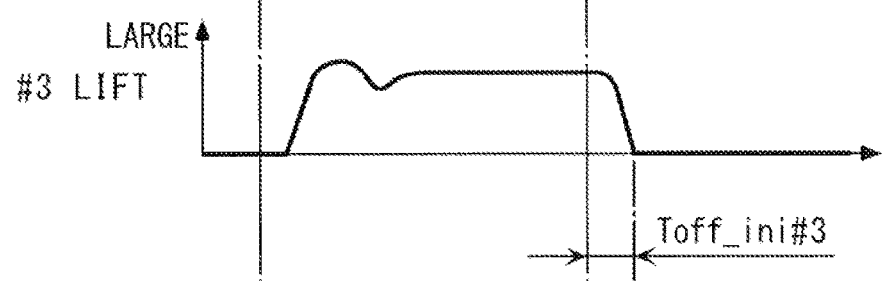
Figure 7D:
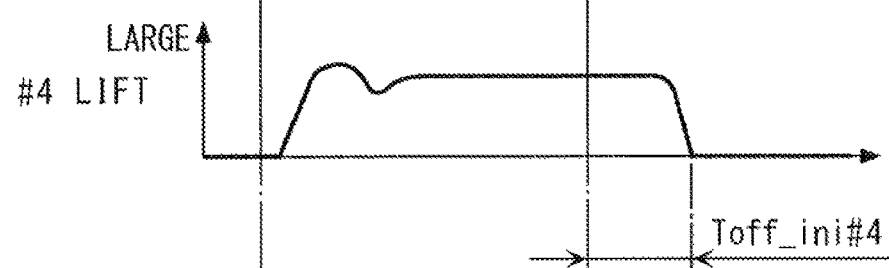
Figure 7E:
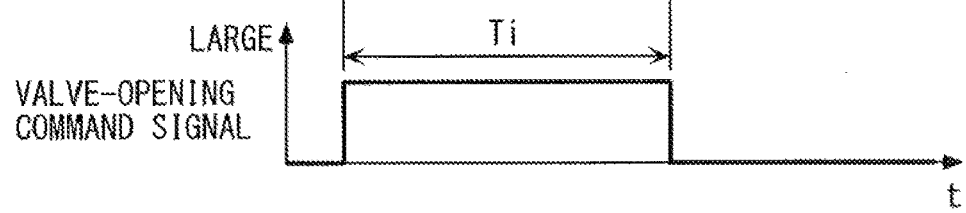

Referring to FIG. 6, first, in a step 20, it is determined whether or not the above-mentioned initial value-specific control flag F_INI_CTRL is equal to 1. If the answer to this question is affirmative (YES), i.e. if the initial value-specific control process, described hereinafter, is being performed, the process proceeds to a step 21, wherein it is determined whether or not the valve-opening time period Ti of the fuel injection valve 10 is not smaller than a predetermined value Tiref.

A region of the valve-opening time period Ti defined by the above predetermined value Tiref (Ti≥Tiref) is set to a region in which the solenoid current Iinj flowing through the electromagnet 12 becomes stable and the valve-closing delay time period Toff becomes stable, as described hereinafter. In the following description, the region of each of parameters, such as the valve-opening time period Ti, in which the valve-closing delay time period Toff becomes stable, is referred to as the "Toff stable region".

If the answer to the question of the step 21 is affirmative (YES), i.e. if the valve-opening time period Ti is in the Toff stable region, the process proceeds to a step 22, wherein it is determined whether or not a fuel temperature Tfuel satisfies a condition of T1≤Tfuel≤T2. The fuel temperature Tfuel is calculated by searching a map (not shown) according to the engine coolant temperature TW and the atmospheric air temperature TA. Further, T1 and T2 represent predetermined values of the fuel temperature Tfuel set such that T1<T2 holds. A temperature region defined by the predetermined values T1 and T2 (T1≤Tfuel≤T2) is set to the Toff stable region.

If the answer to the question of the step 22 is affirmative (YES), i.e. if the fuel temperature Tfuel is in the Toff stable region, the process proceeds to a step 23, wherein it is determined whether or not the engine speed NE is not higher than a predetermined rotational speed NEref. A rotational speed region defined by the predetermined rotational speed NEref (NE≤NEref) is set to the Toff stable region.

If the answer to the question of the step 23 is affirmative (YES), i.e. if the engine speed NE is in the Toff stable region, the process proceeds to a step 24, wherein it is determined whether or not the fuel pressure PF satisfies a condition of PF1≤PF≤PF2. In this case, PF1 and PF2 represent predetermined values of the fuel pressure PF set such that PF1<PF2 holds. A pressure region defined by the predetermined values PF1 and PF2 (PF1≤PF≤PF2) is set to the Toff stable region.

If the answer to the question of the step 24 is affirmative (YES), i.e. if the fuel pressure PF is in the Toff stable region, it is determined that the conditions for learning the initial value Toff_ini of the valve-closing delay time period are satisfied, and to indicate the fact, the process proceeds to a step 25, wherein an initial value-learning condition flag F_INI_LRN is set to 1, followed by terminating the present process.

On the other hand, if the answer to the question of any one of the steps 20 to 24 is negative (NO), it is determined that the conditions for learning the initial value Toff_ini of the valve-closing delay time period are not satisfied, and to indicate the fact, the process proceeds to a step 26, wherein the initial value-learning condition flag F_INI_LRN is set to 0, followed by terminating the present process.

Referring again to FIG. 4, after the initial learning condition determination process is performed in the step 3, as described above, the process proceeds to a step 4, wherein it is determined whether or not the initial value-learning condition flag F_INI_LRN is equal to 1. If the answer to this question is negative (NO), i.e. if the conditions for learning the initial value Toff_ini of the valve-closing delay time period are not satisfied, the present process is immediately terminated.

On the other hand, if the answer to the question of the step 4 is affirmative (YES), i.e. if the conditions for learning the initial value Toff_ini of the valve-closing delay time period are satisfied, the process proceeds to a step 5, wherein a process for setting a learning cylinder number #j is performed.

In this setting process, although details thereof are not illustrated here, one of the first to fourth injection valves 10, for which fuel injection is to be first performed at a time later than this control time, is determined as a learning valve 10 from which an initial value Toff_ini of the valve-closing delay time period should be learned this time, based on the crank angle CA, and the number of a cylinder 3a in which the learning valve 10 is provided is set as the learning cylinder number #j.

For example, in a case where the learning valve 10 is provided in the first cylinder 3a, the learning cylinder number #j is set to #1, whereas in a case where the learning valve 10 is provided in the fourth cylinder 3a, the learning cylinder number #j is set to #4. Note that in the following description, various calculated values with the suffix of the learning cylinder number #j correspond to values calculated for the cylinder 3a represented by the learning cylinder number #j.

In a step 6 following the step 5, an initial value Toff_ini#j of the valve-closing delay time period of the learning valve 10 is calculated. In this calculation process, although details thereof are not illustrated here, the initial value Toff_ini#j of the valve-closing delay time period of the learning valve 10 is calculated by the following well-known method: The first-order differential value of the solenoid voltage Vinj of the learning valve 10 is calculated, and a peak position thereof is detected as an actual valve-closing time, whereafter a time period from the stop time of the valve-opening command signal to the actual valve-closing time is calculated as the initial value Toff_ini#j of the valve-closing delay time period of the learning valve 10.

Then, the process proceeds to a step 7, wherein it is determined whether or not learning of all the fuel injection valves 10 (i.e. the first to fourth injection valves 10) has been completed. If the answer to this question is negative (NO), i.e. if learning of all the fuel injection valves 10 has not been completed, the present process is immediately terminated.

On the other hand, if the answer to the question of the step 7 is affirmative (YES), i.e. if learning of all the fuel injection valves 10 has been completed, to indicate the fact, the process proceeds to a step 8, wherein the initial value learning completion flag F_INI_DONE is set to 1, and both the initial value-specific control flag F_INI_CTRL and the initial value-learning condition flag F_INI_LRN are set to 0. Then, the values F_INI_DONE, F_INI_CTRL, and F_INI_LRN of the three flags are written into the E2PROM, followed by terminating the present process.

Next, the reason for learning the initial values Toff_ini#j (j=1 to 4) of the valve-closing delay time periods of the four fuel injection valves 10 by the above-described method will be described with reference to FIG. 7A to FIG. 7E and FIGS. 8A and 8B.

FIGS. 7A to 7E show, for reference purposes, examples of operations performed by the first to fourth injection valves 10 in brand-new states when the valve-opening command signal for commanding the same valve-opening time period Ti (see FIG. 7E) is simultaneously input to the injection valves 10, at the time point when the injection valves 10 are mounted on the engine 3. In FIGS. 7A to 7D, #1 lift to #4 lift denote the lifts of the first to fourth injection valves 10, respectively.

Referring to FIGS. 7A to 7E, even when the valve-opening command signal for commanding the same valve-opening time period Ti is input, the initial value Toff_ini#j (j=1 to 4) of the valve-closing delay time period generally varies between the first to fourth injection valves 10, e.g. due to variation in the operating characteristics between individual products of the injection valves 10. Therefore, in the present embodiment, when the fuel injection control process, described hereinafter, is performed, with a view to suppressing influence of the variation in the initial value Toff_ini#j of the valve-closing delay time period to thereby improve control accuracy of fuel injection, learning of the initial value Toff_ini#j of the valve-closing delay time period is performed by the above-described method shown in FIG. 4 before a brand-new vehicle is provided to a user.

Figure 8A:
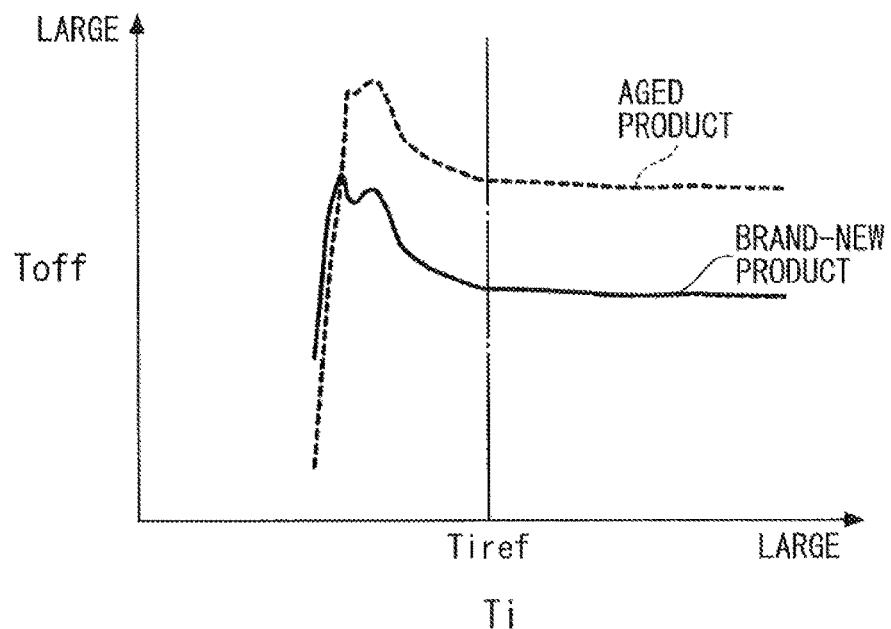
FIG. 8A is a diagram showing a relationship between a valve-opening time period and a valve-closing delay time period of the brand-new fuel injection valve and those of the aged fuel injection valve.

Further, in FIG. 8A, a curve indicated by a solid line indicates a result of measurement of the relationship between the valve-opening time period Ti and the valve-closing delay time period Toff in the case of the fuel injection valve 10 being brand-new, and a curve indicated by a broken line indicates the result of measurement of the relationship between the valve-opening time period Ti and the valve-closing delay time period Toff in the case of the fuel injection valve 10 being an aged one.

Figure 8B:
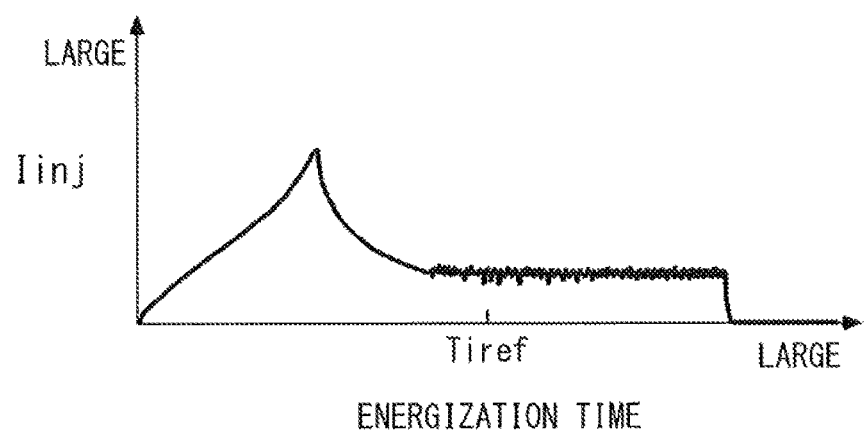
FIG. 8B is a diagram showing a relationship between electric current flowing through an electromagnet of the fuel injection valve and energization time.

As is apparent from FIG. 8A, it is understood that both in the case where the fuel injection valve 10 is brand-new and in the case where the fuel injection valve 10 is an aged one, the valve-closing delay time period Toff indicates an unstable value in a region where Ti<Tiref holds, whereas it indicates a stable value in a region where Ti≥Tiref holds. This is because as shown in FIG. 8B, in the case of supplying electric power to the electromagnet 12 of the fuel injection valve 10, when the electromagnet 12 has been energized over a time period long enough to reach a region in which the energization time≥Tiref holds, the solenoid current Iinj is stabilized. For the above reason, in the present embodiment, the condition of satisfying Ti≥Tiref is set as one of the conditions for learning the initial value Toff_ini#j of the valve-closing delay time period.

Next, a normal learning process will be described with reference to FIG. 9. The normal learning process calculates a normal learned value Toff_LRN (learned value) of the valve-closing delay time period during operation of the engine 3 after execution of the above-described initial value learning process, as described hereinafter, and is performed by the ECU 2 at the above-mentioned predetermined control period ΔT.

Figure 9:
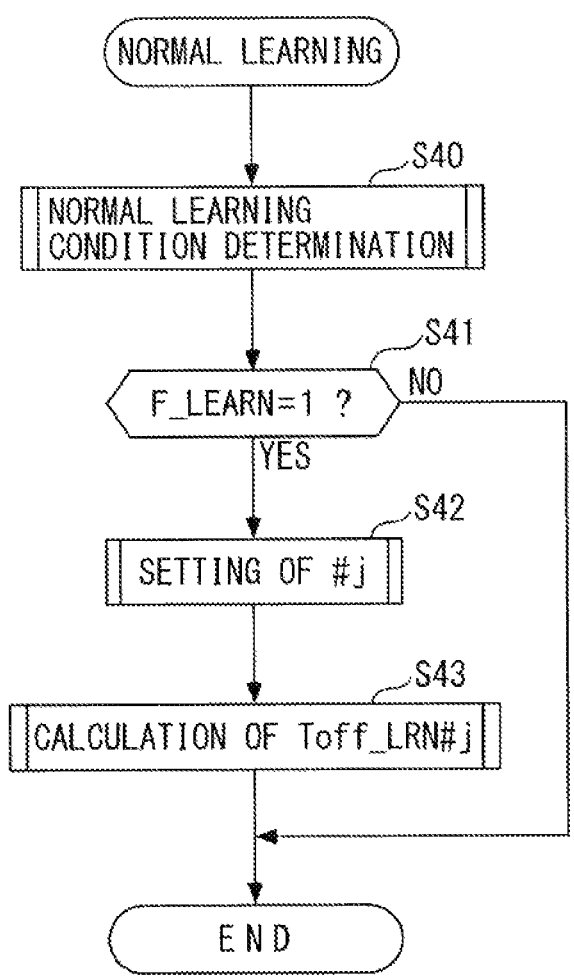
FIG. 9 is a flowchart of a normal learning process.

Referring to FIG. 9, first, in a step 40, a normal learning condition determination process is performed. The normal learning condition determination process determines whether or not conditions for learning the normal learned value Toff_LRN of the valve-closing delay time period (calculation condition) are satisfied, as described hereinafter, and is specifically performed as described with reference to FIG. 10.

Figure 10:
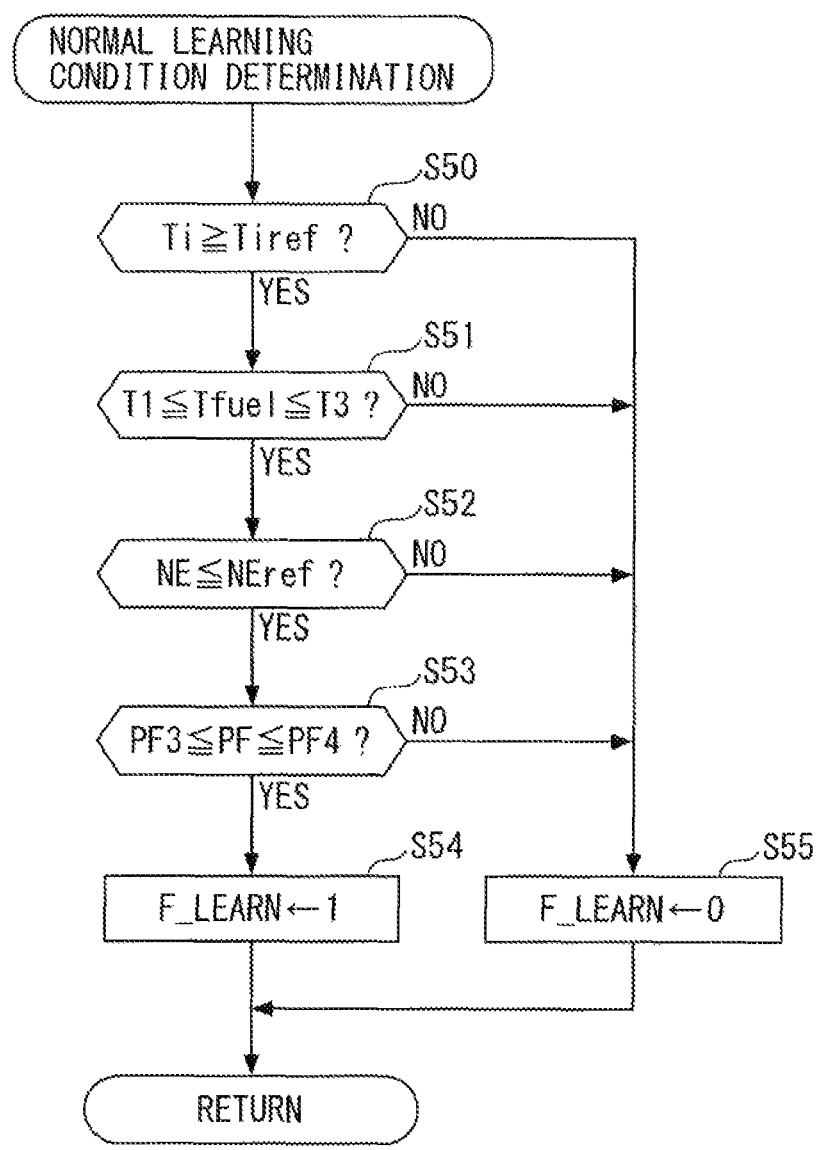
FIG. 10 is a flowchart of a normal learning condition determination process.

Referring to FIG. 10, first, in a step 50, in a similar manner to the above-described step 21, it is determined whether or not the valve-opening time period Ti of the fuel injection valve 10 is not smaller than the predetermined value Tiref. If the answer to this question is affirmative (YES), i.e. if the valve-opening time period Ti is in the Toff stable region, the process proceeds to a step 51, wherein it is determined whether or not the fuel temperature Tfuel satisfies the condition of T1≤Tfuel≤T3.

In this case, T3 represents such a predetermined value of the fuel temperature Tfuel as will satisfy the condition of T1<T2<T3, and a temperature region defined by the two predetermined values T1 and T3 (T1≤Tfuel≤T3) is set to the Toff stable region of the fuel temperature Tfuel during normal operation of the engine 3.

If the answer to the question of the step 51 is affirmative (YES), i.e. if the fuel temperature Tfuel is in the Toff stable region, the process proceeds to a step 52, wherein in a similar manner to the above-described step 23, it is determined whether or not the engine speed NE is not higher than the predetermined rotational speed NEref. If the answer to this question is affirmative (YES), i.e. if the engine speed NE is in the Toff stable region, the process proceeds to a step 53, wherein it is determined whether or not the fuel pressure PF satisfies the condition of PF3≤PF≤PF4.

In this case, PF3 and PF4 represent predetermined values of the fuel pressure PF set such that PF3<PF4 holds, and a pressure region defined by these values PF3 and PF4 (PF3≤PF≤PF4) is set to the Toff stable region of the fuel pressure PF during the normal operation of the engine 3.

If the answer to the question of the step 53 is affirmative (YES), i.e. if the fuel pressure PF is in the Toff stable region, it is determined that the conditions for learning the normal learned value Toff_LRN of the valve-closing delay time period are satisfied, and to indicate the fact, the process proceeds to a step 54, wherein a normal learning condition flag F_LEARN is set to 1, followed by terminating the present process.

On the other hand, if the answer to the question of any one of the steps 50 to 53 is negative (NO), it is determined that the conditions for learning the normal learned value Toff_LRN of the valve-closing delay time period are not satisfied, and to indicate the fact, the process proceeds to a step 55, wherein the normal learning condition flag F_LEARN is set to 0, followed by terminating the present process.

Referring again to FIG. 9, after the normal learning condition determination process is performed in the step 40 as described above, the process proceeds to a step 41, wherein it is determined whether or not the normal learning condition flag F_LEARN is equal to 1. If the answer to this question is negative (NO), i.e. if the conditions for learning the normal learned value Toff_LRN of the valve-closing delay time period are not satisfied, the present process is immediately terminated.

On the other hand, if the answer to the question of the step 41 is affirmative (YES), i.e. if the conditions for learning the normal learned value Toff_LRN of the valve-closing delay time period are satisfied, the process proceeds to a step 42, wherein the learning cylinder number #j is set by a method similar to the method employed in the step 5. As described hereinabove, the learning cylinder number #j is the number of a cylinder 3a in which the learning valve 10 is provided, i.e. the number of a cylinder 3a in which is provided a fuel injection valve 10 from which the normal learned value Toff_LRN of the valve-closing delay time period should be learned this time.

Then, the process proceeds to a step 43, wherein a normal learned value Toff_LRN#j of the valve-closing delay time period of the learning valve 10 is calculated. In the case of this calculation process, although details thereof are not illustrated here, the normal learned value Toff_LRN#j of the valve-closing delay time period of the learning valve 10 is calculated by the same calculation method as the above-described method of calculating the initial value Toff_ini#j of the valve-closing delay time period. After the normal learned value Toff_LRN#j of the valve-closing delay time period of the learning valve 10 is calculated in the step 43, as described above, and is written in the E2PROM, the present process is terminated.

Next, the fuel injection control process will be described with reference to FIG. 11. As described hereinafter, the fuel injection control process controls the valve-opening time periods Ti of the first to fourth injection valves 10, and the like, and is performed by the ECU 2 in timing synchronous with generation of each pulse of the TDC signal.

Figure 11:
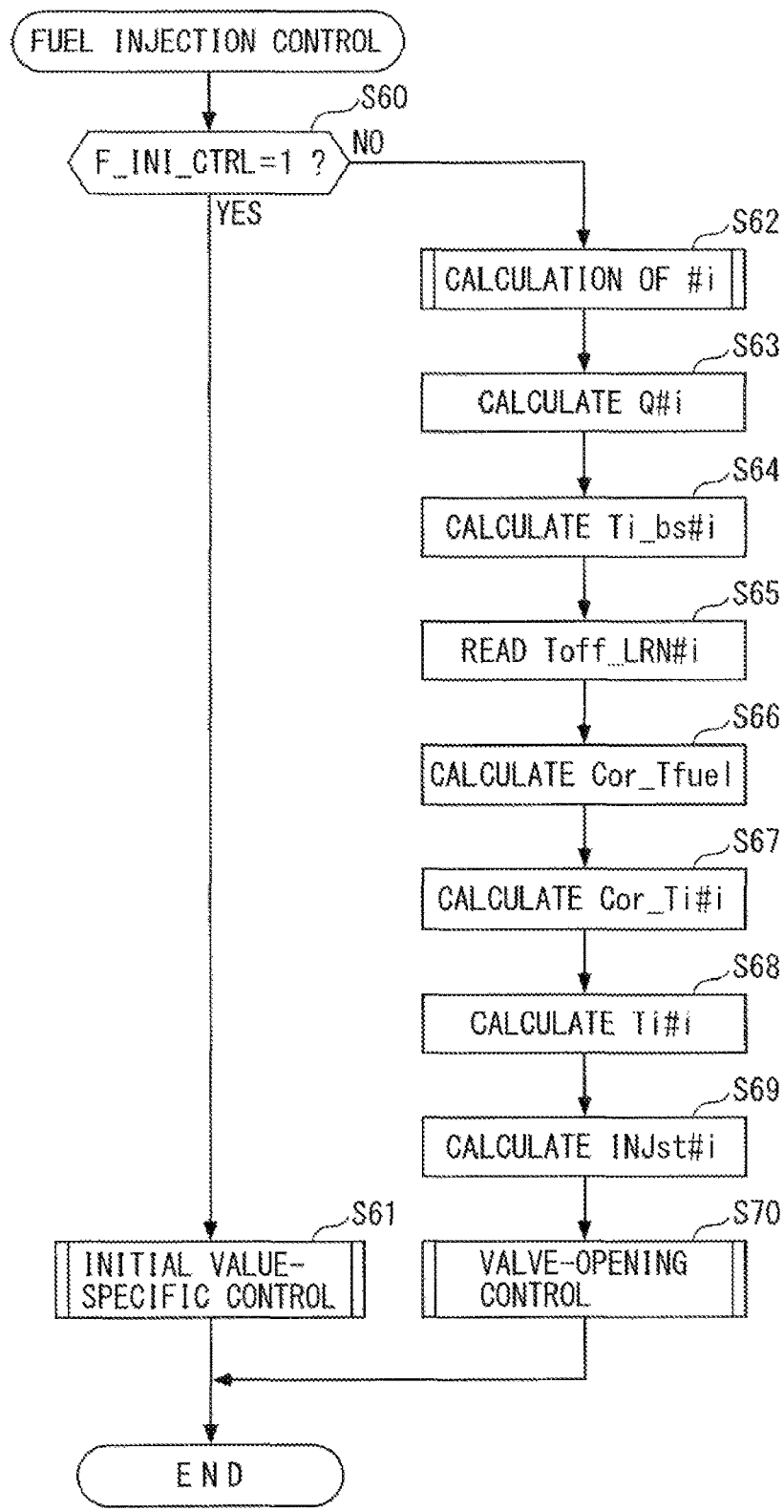
FIG. 11 is a flowchart of a fuel injection control process.

Referring to FIG. 11, first, in a step 60, it is determined whether or not the above-mentioned initial value-specific control flag F_INI_CTRL is equal to 1. If the answer to this question is affirmative (YES), the process proceeds to a step 61, wherein an initial value-specific control process in the fuel injection control process is performed. In this initial value-specific control process, the valve-opening time period Ti of each fuel injection valve 10 is set to an initial control value Ti_ini optimum for learning the initial value Toff_ini of the valve-closing delay time period. In this case, the initial control value Ti_ini is set to a predetermined value which is larger than a normal idling operation value Ti_idl, and also is larger than the above-mentioned predetermined value Tiref (see FIG. 14).

Further, a valve-opening timing INJst, which is the start time of injection of fuel from the fuel injection valve 10, is set to an initial learning value INJst_ini. The initial learning value INJst_ini is an optimum value for learning the initial value Toff_ini of the valve-closing delay time period, and is set to such a value as will cause the initial learning conditions described above with reference to FIG. 6 to be satisfied. Whenever the initial value-specific control process is performed, a valve-opening command signal associated with the two initial control values Ti_ini and INJst_ini is delivered to the first to fourth injection valves 10 in the order of the first injection valve 10→the third injection valve 10→the fourth injection valve 10→the second injection valve 10→the first injection valve 10, and so forth. After the initial value-specific control process is performed in the step 61 as described above, the present process is terminated.

On the other hand, if the answer to the question of the step 60 is negative (NO), as described hereinafter, in steps 62 to 70, a normal-time control process in the fuel injection control process is performed. First, in the step 62, a process for setting a calculation cylinder number #i is performed.

In this setting process, although details thereof are not illustrated here, one of the first to fourth cylinders 3a, for which fuel injection is to be first performed at a time later than this control time, is determined as a calculation cylinder 3a, based on the crank angle CA, and the number of the calculation cylinder 3a is set as the calculation cylinder number #i.

For example, in a case where the calculation cylinder 3a is the first cylinder 3a, the calculation cylinder number #i is set to #1, and in a case where the calculation cylinder 3a is the fourth cylinder 3a, the calculation cylinder number #i is set to #4. Note that in the following description, various calculated values with the suffix of the calculation cylinder number #i correspond to values calculated for the cylinder 3a represented by the calculation cylinder number #i.

In a step 63 following the step 62, a demanded fuel amount Q#i of the calculation cylinder 3a is calculated. The demanded fuel amount Q#i is calculated by calculating a demanded torque TRQ by searching a map (not shown)

according to the accelerator pedal opening AP and the engine speed NE, and then searching a map (not shown) according to the demanded torque TRQ and the engine speed NE.

Then, the process proceeds to a step 64, wherein a basic valve-opening time period Ti_bs#i of the calculation cylinder 3a (basic value of the valve-opening time period) is calculated by searching a map (not shown) according to the demanded fuel amount Q#i of the calculation cylinder 3a.

Next, in a step 65, the normal learned value Toff_LRN#i of the valve-closing delay time period of the calculation cylinder 3a stored in the E2PROM is read.

In a step 66 following the step 65, a temperature-dependent correction value Cor_Tfuel is calculated. The temperature-dependent correction value Cor_Tfuel is calculated by searching a map (not shown) according to the above-described fuel temperature Tfuel.

Then, the process proceeds to a step 67, wherein a valve-opening time period correction value Cor_Ti#i (correction value) is calculated by the following equation (1):

$$Cor\_Ti\#i = KG \cdot (Toff\_LRN\#i - Toff\_ini\#i - Cor\_Tfuel) \quad (1)$$

In the equation (1), KG represents a predetermined gain coefficient (predetermined coefficient) set such that 0<KG<1 holds, and in the present embodiment, the gain coefficient KG is set to a fixed value. Note that instead of being set to the fixed value, the gain coefficient KG may be set to a value calculated by a map search method according to an operating state of the engine 3.

Next, in a step 68, a valve-opening time period Ti#i of the calculation cylinder 3a is calculated by the following equation (2):

$$Ti\#i = Ti\_bs\#i - Cor\_Ti\#i \quad (2)$$

In a step 69 following the step 68, a valve-opening timing INJst#i of the calculation cylinder 3a is calculated. Specifically, a valve-closing timing INJend#i of the calculation cylinder 3a is calculated by searching a map (not shown) according to the valve-opening time period Ti#i and the engine speed NE, and the valve-opening timing INJst#i of the calculation cylinder 3a is calculated by searching a map (not shown) according to the valve-closing timing INJend#i and the valve-opening time period Ti#i.

Then, the process proceeds to the step 70, wherein a valve-opening control process is performed, followed by terminating the present process. In this valve-opening control process, although details thereof are not illustrated here, a valve-opening command signal associated with the valve-opening timing INJst#i and the valve-opening time period Ti of the calculation cylinder 3a is delivered to the fuel injection valve 10 of the calculation cylinder 3a, whereby injection of fuel from the calculation cylinder 3a is performed.

Next, an ignition timing control process will be described with reference to FIG. 12. As described hereafter, the ignition timing control process controls the ignition timing IG at which a mixture is ignited by each spark plug 6, and is performed by the ECU 2 in timing synchronous with generation of each pulse of the TDC signal. Note that in the present embodiment, the ignition timing IG is controlled to a larger positive value as it is to be more advanced.

Figure 12:
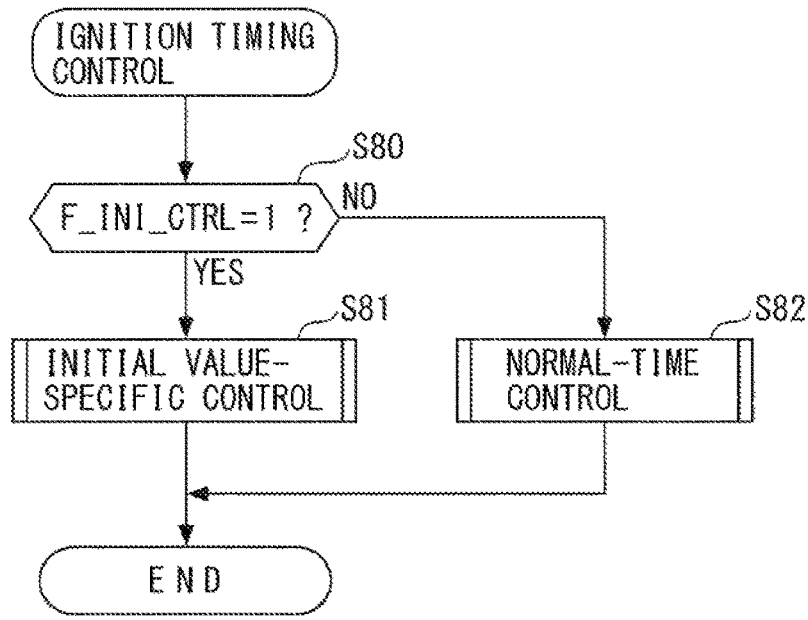
FIG. 12 is a flowchart of an ignition timing control process.

Referring to FIG. 12, first, in a step 80, it is determined whether or not the above-mentioned initial value-specific control flag F_INI_CTRL is equal to 1. If the answer to this question is affirmative (YES), the process proceeds to a step 81, wherein an initial value-specific control process in the ignition timing control process is performed. In this initial value-specific control process, the ignition timing IG is controlled to an initial learning value IGini more retarded than a normal idling operation value IGidl (see FIG. 14). That is, retard control of the ignition timing IG is performed. In this case, the initial learning value IGini is an optimum value for learning the initial value Toff_ini of the valve-closing delay time period, and is set to such a value as will cause the initial learning conditions described above with reference to FIG. 6 to be satisfied. After the initial value-specific control process is performed in the step 81 as described above, the present process is terminated.

On the other hand, if the answer to the question of the step 80 is negative (NO), the process proceeds to a step 82, wherein a normal-time control process in the ignition timing control process is performed. In this normal-time control process, although details thereof are not illustrated here, the ignition timing IG is controlled according to various operating state parameters, such as the engine coolant temperature TW, the accelerator pedal opening AP, and a battery voltage. After the normal-time control process is performed in the step 82 as described above, the present process is terminated.

Next, an intake control process will be described with reference to FIG. 13. As described hereafter, the intake control process controls the throttle valve opening TH, and is performed by the ECU 2 at a predetermined control period (e.g. several hundreds of msec).

Figure 13:
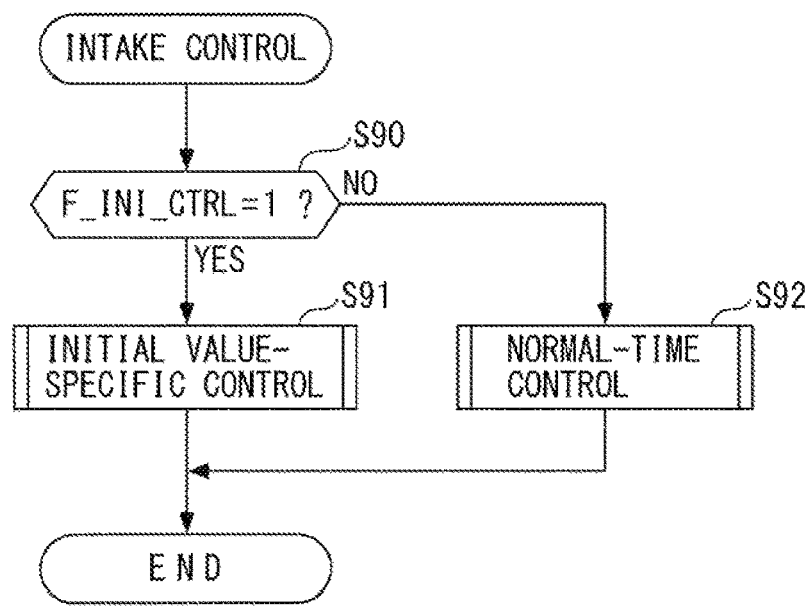
FIG. 13 is a flowchart of an intake control process.

Referring to FIG. 13, first, in a step 90, it is determined whether or not the above-mentioned initial value-specific control flag F_INI_CTRL is equal to 1. If the answer to this question is affirmative (YES), the process proceeds to a step 91, wherein an initial value-specific control process in the intake control process is performed.

In this initial value-specific control process, the throttle valve opening TH is controlled such that the engine speed NE becomes equal to a predetermined initial learning value NEini. The initial learning value NEini represents an optimum engine speed NE for learning the initial value Toff_ini of the valve-closing delay time period, and is set to a value which is higher than a normal idle engine speed NEidl, and also is lower than the above-mentioned predetermined value NEref (see FIG. 14). After the initial value-specific control process is performed in the step 91 as described above, the present process is terminated.

On the other hand, if the answer to the question of the step 90 is negative (NO), the process proceeds to a step 92, wherein a normal-time control process in the intake control process is performed. In this normal-time control process, although details thereof are not illustrated here, the throttle valve opening TH is controlled according to various operating state parameters, such as the engine speed NE and the accelerator pedal opening AP. After the normal-time control process is performed in the step 92 as described above, the present process is terminated.

Next, examples of control results obtained by performing the above-described initial value learning process and the initial value-specific control processes in the steps 61, 81, and 91 will be described with reference to FIG. 14.

Figure 14:
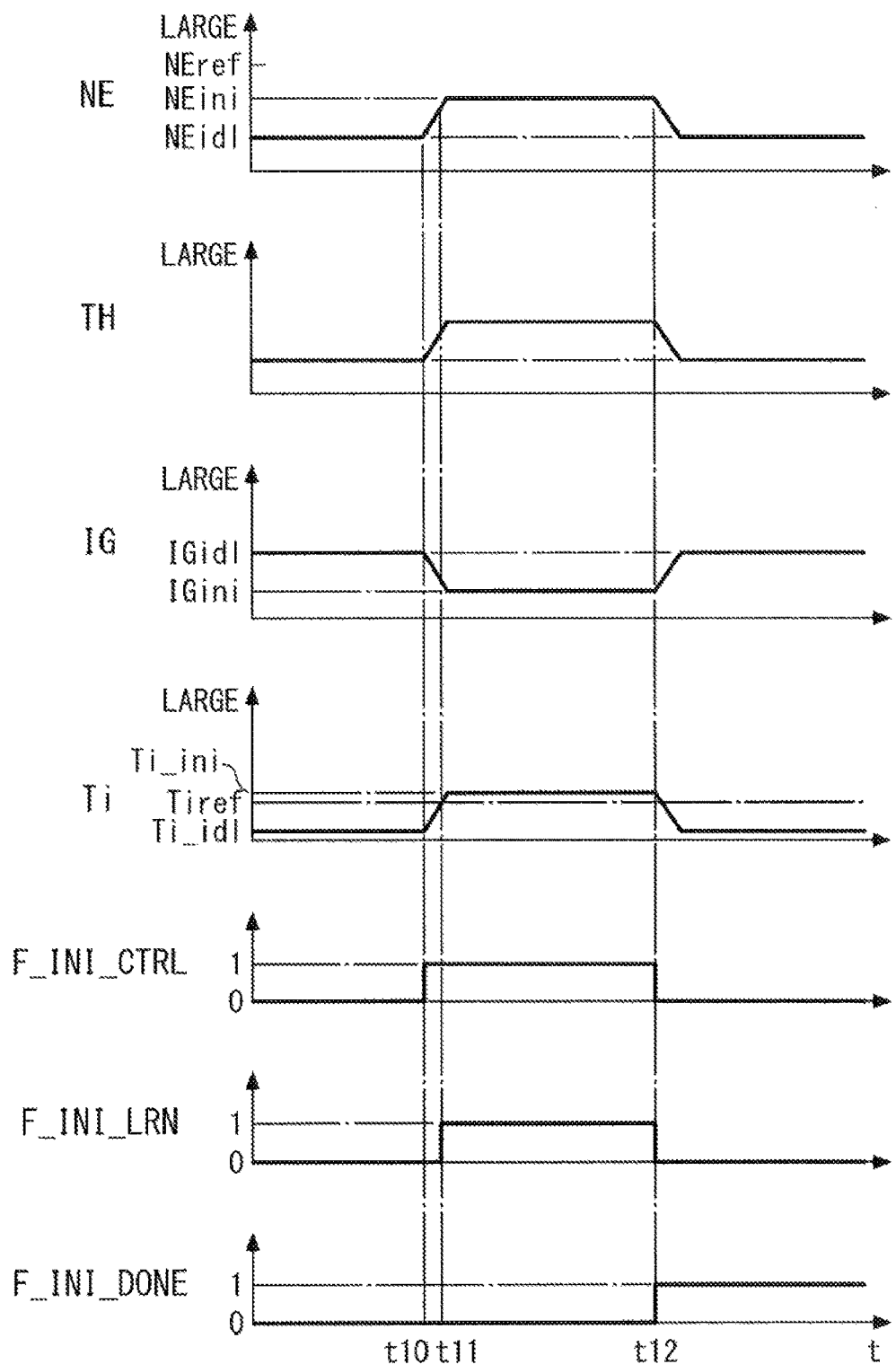
FIG. 14 is a timing diagram showing an example of control results by the control system.

As shown in FIG. 14, during idling operation, when the above-mentioned initial value-specific control flag F_INI_CTRL is set to 1 at a time when the execution command signal is input to the ECU 2 (time point t10), this causes the initial value-specific control processes in the steps 61, 81, and 91 to be performed. That is, the engine speed NE is controlled to change from the idling operation value NEidl to the initial learning value NEini higher than the idling operation value NEidl, and the ignition timing IG is controlled to change from the normal idling operation value IGidl to the initial learning value IGini more retarded than the normal idling operation value IGidl. Further, the valve-opening time period Ti is controlled to change from the normal idling operation value Ti_idl to the initial control value Ti_ini which is larger than normal idling operation value Ti_idl, and also is larger than the above-mentioned predetermined value Tiref.

Then, at a time (time point t11) when all the answers to the questions of the steps 20 to 24 become affirmative (YES), which means that the initial learning conditions are satisfied, the initial value-learning condition flag F_INI_LRN is set to 1, whereafter learning of the initial value Toff_ini of the valve-closing delay time period is performed. Then, at a time point t12, when the learning of the initial values Toff_ini of the valve-closing delay time periods of all the fuel injection valves 10 is completed, the initial value learning completion flag F_INI_DONE is set to 1, and at the same time, the two flags F_INI_CTRL and F_INI_LRN are reset to 0. Along with this, the engine 3 is shifted to normal idling operation.

As described hereinabove, according to the control system 1 of the present embodiment, before a brand-new vehicle is provided to a user, e.g. in a factory, after an inspection device is electrically connected to the ECU 2, when the execution command signal is input from the inspection device to the ECU 2 by manual operation of an inspector, the initial-value specific control processes in the steps 61, 81, and 91 are performed in the fuel injection control process, the ignition timing control process, and the intake control process, so as to cause the initial learning conditions to be satisfied.

Then, during execution of these initial value-specific control processes, when all the answers to the questions of the steps 21 to 24 in the initial learning condition determination process in FIG. 6 are affirmative (YES), i.e. when the conditions of Ti≥Tiref, Tfuel1≤Tfuel≤Tfuel2, NE≤NEref, and PF1≤PF≤PF2 are all satisfied, and hence the valve-closing delay time period Toff of each fuel injection valve 10 becomes stable, the initial value Toff_ini of the valve-closing delay time period is learned, on a cylinder-by-cylinder basis. Therefore, it is possible to accurately learn variation in the initial values Toff_ini of the valve-closing delay time period between the four fuel injection valves 10.

Further, in the normal learning process in FIG. 9, when all the answers to the questions of the steps 50 to 53 are affirmative (YES), i.e. when the conditions of Ti≥Tiref, Tfuel1≤Tfuel≤Tfuel3, NE≤NEref, and PF3≤PF≤PF4 are all satisfied, and hence the valve-closing delay time period Toff of each fuel injection valve 10 becomes stable, the normal learned value Toff_LRN of the valve-closing delay time period is learned, on a cylinder-by-cylinder basis, and hence it is possible to improve learning accuracy of the normal learned value.

Furthermore, the normal-time control process in the fuel injection control process, the basic valve-opening time period Ti_bs is calculated according to an operating state of the engine 3, and the valve-opening time period Ti is calculated by correcting the basic valve-opening time period Ti_bs with the valve-opening time period correction value Cor_Ti. The valve-opening time period correction value Cor_Ti is calculated by multiplying a value obtained by subtracting the initial value Toff_ini and the temperature-dependent correction value Cor_Tfuel from the normal learned value Toff_LRN by the predetermined gain coefficient KG. Therefore, it is possible to calculate the valve-opening time period Ti of each fuel injection valve 10 while causing a change in the valve-closing delay time period Toff of the fuel injection valve 10 from the time point of learning the initial value Toff_ini of the valve-closing delay time period to the present time point and the influence of the fuel temperature Tfuel at the present time point (change in the viscosity resistance of fuel) to be properly reflected thereon. This makes it possible to improve the calculation accuracy of the valve-opening time period Ti.

In addition to this, the predetermined gain coefficient KG is set such that 0<KG<1 holds, and hence even in a case where calculation errors in the normal learned value Toff_LRN and the temperature-dependent correction value Cor_Tfuel are temporarily increased, it is possible to calculate the valve-opening time period Ti while suppressing the influence of the calculation errors thus increased, whereby it is possible to improve control accuracy.

Note that although in the present embodiment, the control system of the present invention is applied to the four-cylinder engine 3, the control system of the present invention is not limited to this, but it can be applied to internal combustion engines with various numbers of cylinders. For example, the control system of the present invention may be applied to internal combustion engines with one to three cylinders, or internal combustion engines with five or more cylinders.

Further, although in the present embodiment, the control system of the present invention is applied to the internal combustion engine for a vehicle, byway of example, the control system of the present invention is not limited to this, but can be applied to internal combustion engines for boats and other industrial machines.

It is further understood by those skilled in the art that the foregoing are preferred embodiments of the invention, and that various changes and modifications may be made without departing from the spirit and scope thereof.

What is claimed is:

1. A control system for an internal combustion engine that includes a fuel injection valve with which a valve-closing delay time period occurs from when a command for closing the fuel injection valve is delivered to the fuel injection valve to when the fuel injection valve is actually closed, comprising:

initial value-specific control means for performing initial value-specific control in which in order to cause initial value acquisition conditions for acquiring an initial value of the valve-closing delay time period to be satisfied, a valve-opening time period of the fuel injection valve is controlled and an ignition timing of the engine is controlled to a retarded side;

initial value acquisition means for acquiring the initial value of the valve-closing delay time period when the initial value acquisition conditions are satisfied during execution of the initial value-specific control;

valve-opening time period calculation means for calculating the valve-opening time period of the fuel injection valve, using the initial value of the valve-closing delay time period, when normal-time control other than the initial value-specific control is performed; and fuel injection control means for controlling the fuel injection valve such that the fuel injection valve is opened over the calculated valve-opening time period when the normal-time control is performed; and learned value acquisition means for acquiring a learned value of the valve-closing delay time period when conditions for learning the valve-closing delay time period are satisfied during execution of the normal-time control, and wherein said valve-opening time period calculation means calculates the valve-opening time period of the fuel injection valve using a difference between the learned value of the valve-closing delay time period and the initial value of the valve-closing delay time period.

2. The control system according to claim 1, wherein the initial value acquisition conditions include that the valve-opening time period of the fuel injection valve during execution of the initial value-specific control is not shorter than a predetermined value.

3. The control system according to claim 1, wherein the initial value acquisition conditions include that a rotational speed of the engine is in a predetermined rotational speed region, that fuel pressure supplied to the fuel injection valve is in a predetermined pressure region, and that a fuel temperature is in a predetermined temperature region.

4. The control system according to claim 1, further comprising:
basic value calculation means for calculating a basic value of the valve-opening time period according to an operating state of the engine; and
correction value calculation means for calculating a correction value using a value obtained by multiplying the difference between the learned value of the valve-closing delay time period and the initial value of the valve-closing delay time period by a predetermined coefficient, and
wherein said valve-opening time period calculation means calculates the valve-opening time period by correcting the basic value of the valve-opening time period with the correction value.

5. The control system according to claim 1, wherein the learning conditions include that the valve-opening time period of the fuel injection valve during execution of the normal-time control is not shorter than a predetermined value.

6. The control system according to claim 1, wherein the learning conditions include that the rotational speed of the engine is in a predetermined rotational speed region, that the fuel pressure supplied to the fuel injection valve is in a predetermined pressure region, and that the fuel temperature is in a predetermined temperature region.

7. The control system according to claim 1, wherein the engine includes a plurality of cylinders, and the fuel injection valve provided in each of the plurality of cylinders, and
wherein said initial value acquisition means acquires the initial value of the valve-closing delay time period on a fuel injection valve-by-fuel injection valve basis.

* * * * *